United States Patent
Trimmel et al.

(10) Patent No.: US 9,153,359 B2
(45) Date of Patent: Oct. 6, 2015

(54) CONTINUOUSLY TRANSPOSED CONDUCTOR

(75) Inventors: Thomas Trimmel, Seebenstein (AT); Martin Trimmel, Seebenstein (AT)

(73) Assignee: ASTA ELEKTRODRAHT GMBH, Oed/Wiener Neustadt (AT)

( * ) Notice: Subject to any disclaimer, the term of this patent is extended or adjusted under 35 U.S.C. 154(b) by 0 days.

(21) Appl. No.: 14/001,337

(22) PCT Filed: Feb. 23, 2012

(86) PCT No.: PCT/EP2012/053051
§ 371 (c)(1),
(2), (4) Date: Nov. 4, 2013

(87) PCT Pub. No.: WO2012/113853
PCT Pub. Date: Aug. 30, 2012

(65) Prior Publication Data
US 2014/0049352 A1  Feb. 20, 2014

(30) Foreign Application Priority Data
Feb. 24, 2011 (AT) .................................. A 253/2011

(51) Int. Cl.
*H01F 27/28* (2006.01)
*H01F 27/32* (2006.01)
*H01B 7/30* (2006.01)
*H02K 3/14* (2006.01)

(52) U.S. Cl.
CPC ............ *H01B 7/306* (2013.01); *H01F 27/2823* (2013.01); *H02K 3/14* (2013.01); *H01F 2027/2838* (2013.01)

(58) Field of Classification Search
CPC .............................. H01F 27/2838; H01B 7/306
USPC ......................................................... 336/223
See application file for complete search history.

(56) References Cited

U.S. PATENT DOCUMENTS

| | | | |
|---|---|---|---|
| 4,276,102 A | 6/1981 | Schaeffer et al. | |
| 4,431,860 A | 2/1984 | Perco et al. | |
| 7,365,626 B2 * | 4/2008 | Matsutani et al. | 336/200 |
| 2012/0279754 A1 * | 11/2012 | Rabbia | 174/117 R |

FOREIGN PATENT DOCUMENTS

| AT | 309 590 | 8/1973 |
|---|---|---|
| CN | 101673588 | 3/2010 |
| CN | 201435232 | 3/2010 |

(Continued)

OTHER PUBLICATIONS

Forms PCT/IB/373, 237 and 220 issued in International Application No. PCT/EP2012/053051 (including English language translation).

*Primary Examiner* — Elvin G Enad
*Assistant Examiner* — Ronald Hinson
(74) *Attorney, Agent, or Firm* — Greenblum & Bernstein, P.L.C.

(57) ABSTRACT

In order to be able to industrially produce a transposed conductor having jointly transposed partial conductors located next to one another, the invention proposes that the rounding of at least one edge (15) of a single conductor (11) of a single conductor group (12) that limits a contact surface (14) between two single conductors (11) located next to one another is embodied with a smaller radius ($r_2$) than the radii ($r_1$) of the roundings of the outer edges (13) of the single conductor group (12).

20 Claims, 3 Drawing Sheets

(56) References Cited

FOREIGN PATENT DOCUMENTS

Figure 5:
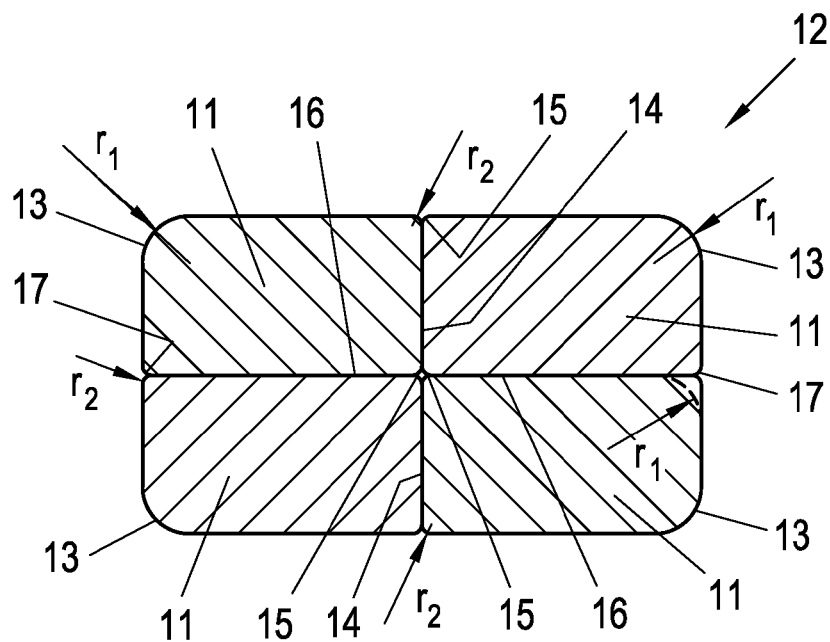

| | | |
|---|---|---|
| CN | 201508700 | 6/2010 |
| CN | 201549337 | 8/2010 |
| EP | 0 133 220 | 2/1985 |
| EP | 0 746 861 | 6/1997 |
| EP | 0 981 139 | 2/2000 |
| EP | 2 325 849 | 5/2011 |
| GB | 1 084 796 | 9/1967 |
| GB | 1 321 574 | 6/1973 |
| WO | WO 98/14964 | 4/1998 |
| WO | WO 2011/009729 | 1/2011 |

* cited by examiner

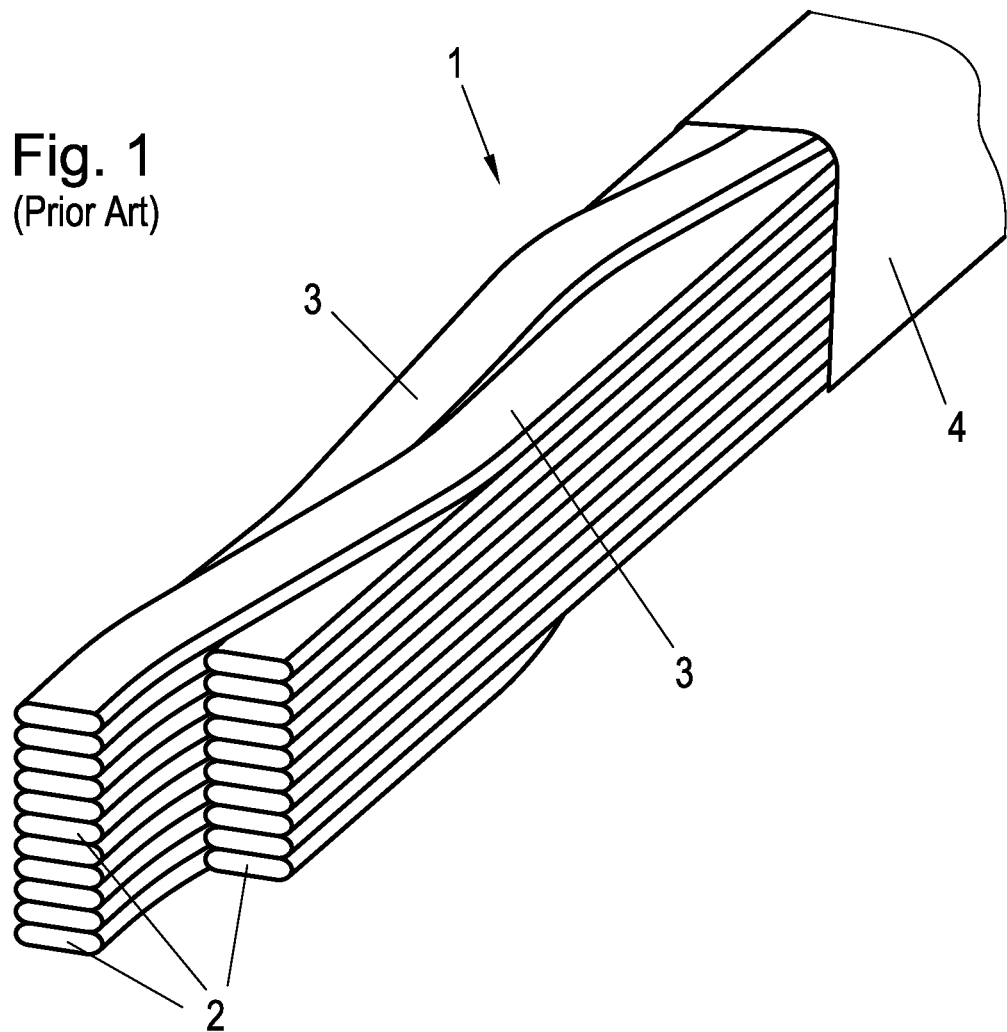
Fig. 1
(Prior Art)
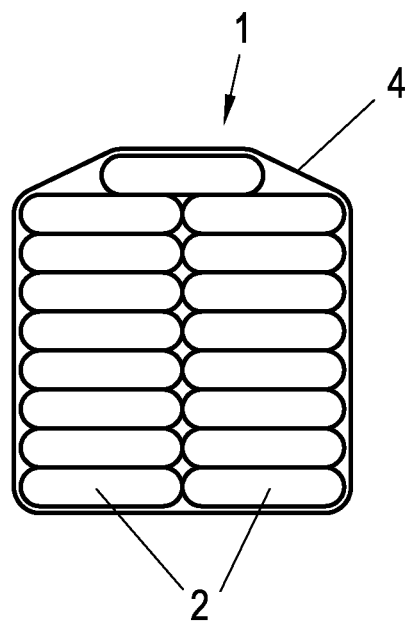

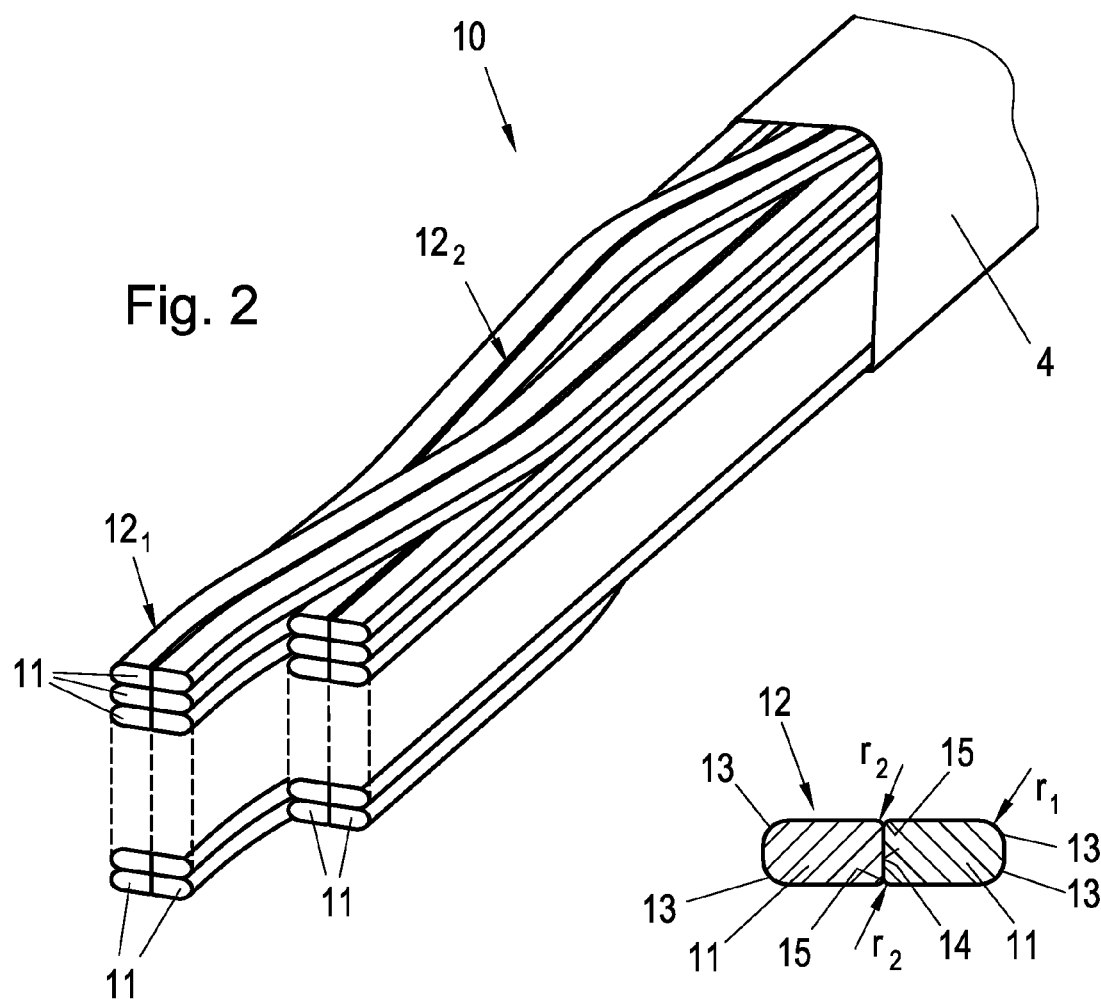
Fig. 2
Fig. 3
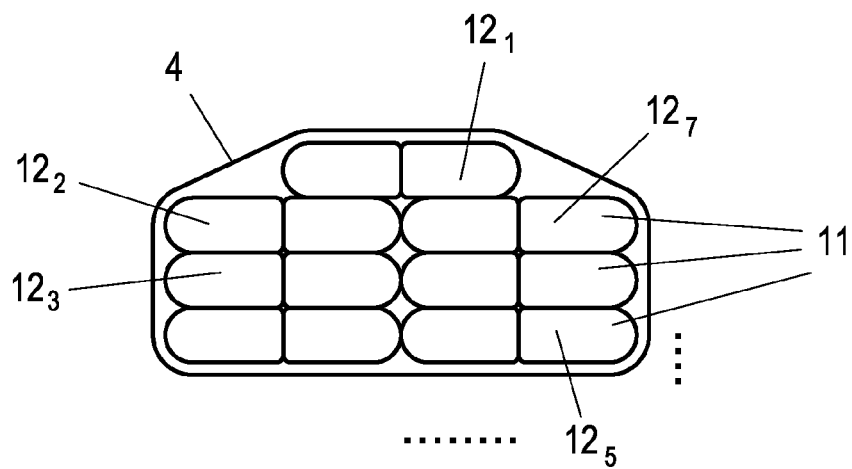
Fig. 4

CONTINUOUSLY TRANSPOSED CONDUCTOR

The present invention relates to a continuously transposed conductor comprising a plurality of individual, electrically insulated single conductors, in which two or more single conductors disposed one above the other are combined into a group of single conductors and transposed together, with the edges of each single conductor being designed in a rounded-off fashion, and a transformer comprising a winding made of such a transposed conductor.

A continuously transposed conductor is understood to be a transposed conductor that is manufactured in long lengths, for example, lengths of a few thousand meters are not rare, and that are subsequently processed to form a winding of an electrical machine, for example, a transformer winding. During the winding process, the transposed conductors experience a strong degree of curvature. In contrast, winding rods or Roebel cables of short length are manually produced and combined to form a winding for an electrical machine (for example, an electric motor or a generator) in that the straight rods are placed in grooves on the rotor and the axial ends of the rods are subsequently connected to one another in a certain fashion in order to form the winding. Such a winding rod is thus also produced from a series of single conductors transposed with one another, with a finished winding rod never being warped or bent in any way in the course of its further processing such that its transposed partial conductors or groups of partial conductors remain in position throughout. Thus, as a matter of principle, different problems occur in the further processing of continuously transposed conductors and winding rods, for which reason they cannot be directly compared to one another.

It is known that electromagnetic radial fields (transverse fields) occur in transformers, primarily in the outermost parts of the winding, which induce eddy currents in the conductors of the winding that lead to eddy current losses. Eddy current losses reduce the efficiency of the transformer, but also cause undesirably high local temperatures, which in turn can cause damage to the winding insulation. By the use of known continuously transposed conductors, such eddy current losses can be reduced. Such transposed conductors comprise a bundle of individual, insulated partial conductors that are individually transposed one against the other, for example, according to the Roebel principle, as is shown, for example, in FIG. 1. Such continuously transposed conductors are known, for example, from EP 746 861 B1 and are produced in a mechanical and automated fashion with lengths of a few thousand meters and are wound onto drums for shipment. Transposed conductors are particularly distinguished by the fact that they are sufficiently flexible that they can be wound in order to produce windings.

For winding rods and Roebel cables, AT 309 590 B discloses providing the transposition in such a way that two adjacent partial conductors are always transposed together. In addition to compensating for the longitudinal field by transposition, this measure is also intended to compensate for the radial field inside a groove, which is already detrimental. Roebel cables, which continue to be primarily manufactured manually in that short partial conductors are manually transposed on special workbenches by a worker, can thus be produced in a simple manner even when two adjacent partial conductors are jointly transposed. Roebel cables, however, are not wound; rather, a winding is "built" from a plurality of Roebel cables by connecting the ends of the Roebel cables correspondingly.

However, demands on modern transformers are constantly increasing, on the one hand, with regard to size and output and, on the other hand, with regard to efficiency and reduction of losses caused by, for example, eddy current. Particularly in the case of very large, high-performance transformers, significant undesired eddy current losses occur due to the magnetic fields. Moreover, the reduction of the hotspot temperature, voltage properties, and fill factor have a great deal of significance in the design of transformer windings.

In currently known transposed conductors, it is not possible to improve the properties mentioned above by physical limits in the transposed conductor production process due to their geometry and manufacturing options. The number of possible single conductors for transposed conductors that can be transposed into a transposed conductor is limited by the so-called transposition factor. The transposition factor $f_D$ is described by the following formula as a function of the inner diameter of the transformer winding, the number of single conductors of the transposed conductor, and the width of the single conductor:

$$f_D = \frac{WD \cdot \pi}{n \cdot b_1}$$

The variables represent
WD smallest winding diameter
n number of single conductors
$b_1$ with of a single conductor Current production technology allows transposed conductors to be produced up to a minimum transposition factor of $f_D=5$, with the number of single conductors, the wire width, and winding diameter being dependent on one another. This limitation of the transposition factor by production technology limits the ability of transposed conductors to be produced with an increasing number of single conductors.

In a transformer winding with conventional transposed conductors, the voltage distribution is also problematic because potential differences between the parallel transposed conductors cause undesired capacities to occur. Moreover, significant eddy current losses, and therefore also high temperatures in the transposed conductor and the winding, occur.

When a plurality of single conductors is used that are transposed together as a bundle of single conductors to form a transposed conductor, the resulting eddy current losses and thus the hotspot temperatures can be reduced. Such a transposed conductor is known, for example, from EP 133 220 A2, in which cables comprised of a group of round single conductors are transposed to form an electrical conductor. A similar conductor is disclosed by U.S. Pat. No. 4,431,860 A, in which the single conductors of the individual cables are transposed into one another again. This allows the number of single conductors to be increased and the physical limitation of the transposition factor to still be maintained at five. However, when round single conductors are used, as is the case in EP 133 220 A2, a poor fill factor results, causing the cross section of the transposed conductor to become undesirably large with the prespecified copper cross section. In one embodiment of the cables, the round single conductors may be deformed in a rectangular fashion in the packet which, although it improves the fill factor somewhat, also requires an additional process step, thus making production more expensive.

However, the transposed conductors disclosed by EP 133 220 A2 and U.S. Pat. No. 4,431,860 A have the distinct disadvantage of expensive production because a partial conductor must first be produced from a number of single conductors by transposing the single conductors and only then are the partial conductors transposed to form a transposed conductor. This results in at least one additional process step, along with all the associated disadvantages such as storage and handling of the single conductors and partial conductors, various transposition systems, longer production times, etc. For this reason, the use of such transposed conductors according to the prior art has more or less been avoided in practice. However, the transposition of the single conductors within the partial conductors allowed a compact, internally stable partial conductor to be produced in which the single conductors cannot shift relative to one another and that is therefore suitable for subsequent transposition to form a transposed conductor. Only in this manner has it been possible up to now to produce transposed conductors with partial conductors made of multiple single wires.

In the joint transposition of partial conductors resting loosely one atop the other, it is possible for the individual partial conductors to shift relative to one another, which would make the finished transposed conductor unusable. Up to now, it has not been possible for two or more single conductors located adjacent to one another to be jointly transposed in one process step of a continuous manufacturing process for producing a continuously transposed conductor. Such a production of a transposed conductor was therefore up to now not controllable from a production standpoint.

One object of the present invention is therefore to disclose a transposed conductor with jointly transposed single conductors located adjacent to one another that enables a simple production of the transposed conductor, in particular in one process step, and that has a sufficient withstand voltage.

This object is attained according to the invention in that the rounding of at least one edge of a single conductor of a single conductor group that limits a contact surface between two single conductors located adjacent to one another is embodied with a smaller radius than the radii of the roundings of the outer edges of the single conductor group. This measure increases the surface area on which the single conductors rest against one another, whereby the single conductors are prevented from shifting over or under one another during transposition, in which the single conductors must be displaced transversely relative to their longitudinal extension without detriment to the withstand voltage of the transposed conductor because the outer edges remain unchanged throughout. At the same time, this also increases the conductor cross section in the transposed conductor, which can have a positive influence on the fill factor.

Preferably, the roundings of all the edges of a single conductor of a single conductor group that limit a contact surface between two single conductors located adjacent to one another are embodied with a smaller radius than the radii of the roundings of the outer edges of the single conductor group. If more than two single conductors are adjacent to one another, it is preferable for the roundings of the edges of all of the single conductors of a single conductor group that limit a contact surface between two single conductors located adjacent to one another to be embodied with a smaller radius than the radii of the roundings of the outer edges of the single conductor group. These measures make the transposition process even more secure and increase the available conductor cross section in the transposed conductor even further.

In a further advantageous embodiment, the single conductors in a single conductor group are disposed in an n×n or n×m arrangement and at least one edge of a single conductor of the single conductor group that limits a contact surface between two single conductors located one atop the other is embodied with a smaller radius than the radii of the roundings of the outer edges of the single conductor group. Here, it is again particularly advantageous for all of the edges that limit the contact surfaces of single conductors located adjacent to one another and one atop the other to be embodied with a smaller radius than the radii of the roundings of the outer edges of the single conductor group.

If the thickness of the insulation layer in a transposed conductor according to the invention is embodied between 0.03 and 0.08 mm, the fill factor of such a transposed conductor can be improved because this allows the increase in the amount of lacquer caused by the greater number of single conductors in the transposed conductor to be effectively counteracted by a reduction in the lacquer layer.

The voltage distribution in a known transformer winding with conventional transposed conductors wound in a parallel fashion is considerably poorer than when transposed conductors according to the invention with separate single conductors are used. In conventional transformer windings, potential differences in the parallel transposed conductors cause capacities to occur that do not occur if a transposed conductor according to the invention with separate single conductors is used because the single conductors in the overall bundle are transposed with one another. Moreover, unifying the parallel transposed conductors to form one transposed conductor with separate single conductors results in an improvement of the fill factor, and the outer dimensions of the transformer become more compact. Thus, the use of a transposed conductor according to the invention in a transformer winding is particularly advantageous.

Figure 6:
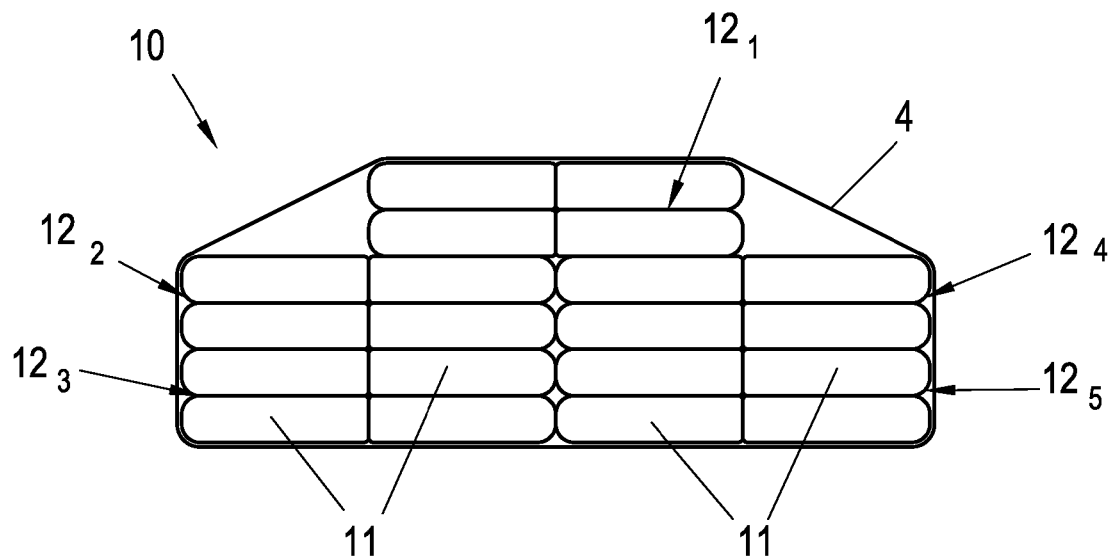

The present invention shall be described below with reference to FIGS. 1 to 6, which show advantageous embodiments by way of example that are in no way limiting. Shown are:

FIG. 1 a conventional transposed conductor according to the prior art,

FIG. 2 a transposed conductor according to the invention having a group of single conductors with single conductors disposed next to one another, FIG. 3 a cross section of a single conductor group, FIG. 4 a cross section of a transposed conductor according to the invention, FIG. 5 a cross section of a single conductor group having an n×m arrangement of single conductors, and FIG. 6 a cross section of a transposed conductor having a single conductor group with an n×m arrangement of single conductors.

FIG. 1 shows a sufficiently known transposed conductor 1 comprising a number of electrically insulated single conductors 2 that are disposed in two single conductor stacks 3. As is known, the single conductors 2 are transposed in such a way that they change position from the uppermost position to the lowest position. A single conductor 2 has a rectangular cross section and rounded edges. In order to guarantee that the bundle of single conductors holds together to form a transposed conductor 1 or in order to protect the transposed conductor, a wrapping 4 may be provided using a woven tape, a strip of paper, or the like.

FIG. 2 shows a continuously transposed conductor 10 according to the invention that comprises a plurality of individual electrically insulated single conductors 11. In this transposed conductor 10, two single conductors 11 located next to one another are combined to form a single conductor group 12 and are jointly transposed. In this context, "next to one another" means that, given a rectangular cross section of the single conductor, the single conductors 11 are disposed in cross section resting against one another on their narrow sides on a contact surface 14, see FIG. 3. Given a quadratic cross section, "next to one another" means that the single conductors are disposed resting against one another transversely to the longitudinal extension of the transposed conductor 10 on a contact surface 14. However, a single conductor group 12 could also comprise more than two single conductors 11 disposed next to one another and therefore multiple contact surfaces 14.

The transposed conductor 10 may in turn be surrounded by a wrapping 4, for example, to protect the single conductors 11 during transport or to stabilize the transposed conductor 10.

Transposition becomes possible in that the radii $r_2$ of the roundings of the edges 15 that limit the contact surface 14 (relative to the winding in the axial direction) of the adjacent single conductors 11 of the single conductor group 12 are smaller than the roundings of the outer edges 13 of the single conductor group, as is shown in FIG. 3. The "outer" edges 13 in this case are the edges of the resulting rectangular (or quadratic) cross section of the single conductor group 12. In principle, it may also be sufficient to round off only one of these edges 15 or one of these edges 15 on each single conductor 11 with a smaller radius $r_2$. From the standpoint of the fill factor and of increasing the conductor cross section, however, it is better for all of these edges 15 of the single conductor 11 to be rounded off with a smaller radius $r_2$. The small radii $r_2$ therefore result in a sufficiently large contact surface 14 that prevents the individual conductors 11 from shifting over or under one another during the transposition process in which the single conductor group 12 must be shifted transversely to the longitudinal extension. In contrast, with the large radii $r_1$ that are necessary on the outside, the single conductors could very easily slide against one another on the radii and it would be very simple for the single conductors 11 to slide over or under one another, which would make the transposition process virtually impossible.

This simple measure allows a transposed conductor 10 having transposed single conductor groups 12 comprising a number of single 11 conductors disposed next to one another to be produced in one process step. A cross section of such a transposed conductor 10 having seven single conductor groups $12_1$ to $12_7$, each comprising two individual single conductors 11 disposed next to one another, is shown in FIG. 4. The transposed conductor 10 may again be surrounded by a wrapping 4, for example, to protect the single conductor 11 during transport or for stabilization of the single conductor bundle.

However, such a transposed conductor 10 also fulfills the requirements for withstand voltage because the roundings on the particularly critical outer edges 13 are not changed. Only the interior edges, i.e., the edges 15 limiting a contact surface 14, on which the electrical field intensities are lower, are embodied with smaller roundings, which does not affect the withstand voltage while increasing the fill factor. Thus, this simple measure allows the inherently contradictory requirements of high withstand voltage and high fill factor to be met.

In another possible embodiment of the transposed conductor 10 according to the invention, a single conductor group 12 comprises a plurality of single conductors 11 disposed next to one another and one atop the other, for example, in an n×n arrangement of single conductors 11, as is shown in FIG. 5, or an n×m arrangement of single conductors 11. In this context, "one atop the other" means that the single conductors 11 are disposed against one another resting on their longitudinal sides in cross section. The single conductors 11 resting next to one another are resting next to one another on a contact surface 14 and the single conductors 11 resting one atop the other are resting against one another on a second contact surface 16 (relative to the winding in the radial direction). According to the invention, at least one rounding of an edge 15 that limits a contact surface 14 between two single conductors 11 is again embodied with a smaller radius $r_2$ than the radii $r_1$ of the outer edges 13 of the single conductor group 12. In the preferred embodiment, as is shown in FIG. 5, all of the edges 15 limiting the contact surfaces 14 are again embodied with this smaller radius $r_2$. It should also be noted here that the radii of these edges 15 need not all be equal; rather, according to the invention, these radii must simply be smaller than the radii $r_1$ of the outer edges 13. Additionally, in the preferred embodiment of a single conductor group 12, the edges 17 of the contact surfaces 16 between two adjacent single conductors located one atop the other are also embodied with a smaller radius $r_2$. However, the radii of these edges 17 can be just as large as the radii $r_1$ of the outer edges 12, as is implied by a dotted line in one place in FIG. 5.

A cross section of such a transposed conductor 10 having five partial conductor groups $12_1$ to $12_5$, comprising 2×2 single conductors 11 is shown in FIG. 6. The transposed conductor 10 may again be surrounded by a wrapping 4, for example, for protecting the single conductors 11 during transport or for stabilizing the single conductor bundle.

A transposed conductor 10 may also be used particularly advantageously in a transformer winding, with a transposed conductor 10 embodied according to the invention being able to replace two conventional transposed conductors (for example, according to FIG. 1) wound in a parallel fashion because the transposed conductor 10 according to the invention contains considerably more, for example, twice as many, single conductors 11.

A transposed conductor 10 according to the invention has a lower fill factor than a conventional transposed conductor with the same cross section because each single conductor 11 must be insulated and, due to the larger number of single conductors 11, more insulation is naturally present in the cross section. According to the applicable norm, the insulation layer of a single conductor 11 is 0.1 mm at grade 1 and 0.15 mm at grade 2. In today's transposed conductors, only quality grade 1 is generally used. In order to improve the fill factor in a transposed conductor 10 according to the invention while maintaining the same cross section, provision may be made for the thickness of the insulation layer to be reduced, preferably to a range of 0.03 to 0.08 mm, preferably also 0.06 mm.

The invention claimed is:
1. A continuously transposed conductor comprising:
two or more transposed single conductor groups;
each single conductor group comprising two or more individual, electrically insulated single conductors, each single conductor having a rectangular cross section with:
two outer edges; and
a narrower side contact surface arranged between two inner edges;
the two or more single conductors of one single conductor group being disposed so that the narrower side contact surfaces are adjacent one another; and
wherein, in said one single conductor group, a radii of at least one inner edge of each single conductor is smaller than a radii of each outer edge of each single conductor, and
wherein the adjacent narrower side contact surfaces are structured and arranged to prevent shifting of the single conductors over or under one another when the two or more single conductor groups are transposed.

2. The continuously transposed conductor of claim 1, further comprising a narrower side outer surface arranged between the two outer edges.

3. The continuously transposed conductor of claim 2, wherein a height of the narrower side outer surface of each single conductor is less than a height of the narrower side contact surface of each single conductor.

4. The continuously transposed conductor of claim 1, wherein each single conductor group has only two single conductors.

5. The continuously transposed conductor of claim 1, wherein all single conductor groups of the continuously transposed conductor have two single conductors.

6. The continuously transposed conductor of claim 1, wherein the two or more single conductor groups comprise seven single conductor groups.

7. The continuously transposed conductor of claim 1, wherein the two or more single conductor groups comprise ten single conductor groups.

8. The continuously transposed conductor of claim 1, wherein the single conductors in the one single conductor group are disposed in an n×n or n×m arrangement.

9. The continuously transposed conductor of claim 1, wherein the two or more single conductor groups comprise pairs of single conductor groups disposed atop one another.

10. The continuously transposed conductor of claim 1, wherein the two or more single conductor groups are disposed atop and on lateral sides of one another.

11. The continuously transposed conductor of claim 1, wherein, in said one single conductor group, a radii of all inner edges is smaller than a radii of all outer edges.

12. The continuously transposed conductor of claim 1, wherein an insulation layer of each single conductor has a thickness of between 0.03 mm and 0.08 mm.

13. The continuously transposed conductor of claim 12, wherein the insulation layer has a thickness of 0.06 mm.

14. A transformer comprising a winding made of the continuously transposed conductor of claim 1.

15. A continuously transposed conductor comprising:
plural transposed conductor groups;
each conductor group comprising at least first and second individual, electrically insulated single conductors, and each single conductor having a rectangular cross section with:
two outer edges having a same radii; and
a narrower side contact surface arranged between two inner edges having a same radii;
the narrower side contact surface of the first single conductor being arranged next to the narrower side contact surface of the second single conductor so to form two pairs of adjacent inner edges,
wherein, in each conductor group, a radii of each of the two pairs of adjacent inner edges is smaller than a radii of each of the two outer edges of the first and second single conductors, and
wherein the narrower side contact surfaces are structured and arranged to prevent shifting of the first and second single conductors over or under one another when the plural conductor groups are transposed.

16. A transformer comprising a winding made of the continuously transposed conductor of claim 15.

17. A continuously transposed conductor comprising:
plural transposed conductor groups;
each conductor group comprising first, second, third and fourth individual, electrically insulated single conductors, and each single conductor having a rectangular cross section with:
two outer edges;
a narrower side contact surface arranged between two inner edges; and
a wider side contact surface arranged between one of the two inner edges and one of the two outer edges;
the narrower side contact surface of the first single conductor being arranged next to the narrower side contact surface of the second single conductor;
the narrower side contact surface of the third single conductor being arranged next to the narrower side contact surface of the fourth single conductor,
wherein, in each conductor group, a radii of one of said inner edges is smaller than a radii of one of said outer edges.

18. The continuously transposed conductor of claim 17, the two outer edges of the first, second, third and fourth single conductors have a same radii.

19. The continuously transposed conductor of claim 17, one of the two outer edges of each of the first, second, third and fourth single conductors has a same radii, and said same radii is larger than another of the two outer edges of each of the first, second, third and fourth single conductors.

20. A transformer comprising a winding made of the continuously transposed conductor of claim 17.

* * * * *